3,382,139
CEMENTITIOUS COMPOSITIONS FOR BITUMINOUS SUBSTRATES

Alexander H. Popkin, Maplewood, George M. Kagan, Fords, and Roman Slysh, Scotch Plains, N.J., assignors to Esso Research and Engineering Company, a corporation of Delaware
No Drawing. Filed Dec. 24, 1964, Ser. No. 421,119
4 Claims. (Cl. 161—236)

This invention relates to cementitious mortars. In particular, this invention relates to a cementitious mortar which gives large bond strengths. More particularly, the invention is directed to a particular composition of cementitious motar wherein the emulsion of a terpolymer is added to cement, filler and water to form mortar. Most particularly, the invention is directed to a cementitious mortar comprising cement, filler, water and a terpolymer of alkyl acrylate, styrene and acrylic acid.

A large number of mortars are well-known to the art, most of which are designed for bonding particular materials together. There are many old and well-known mortars for bonding fired clay brick, some of which are also effective bonding agents for cement blocks, cinder blocks and clay blocks. However, in order to obtain the greatest bonding strength, compressive strength and wet strength, it was necessary for the art to formulate particular mortars to do particular jobs. One of the problems facing the art has been the development of a mortar which would effectively bond structural elements consisting in part of a bituminous binder material. The problem is complicated by the fact that the materials which will effectively bond bituminous materials together are very expensive as when compared to the ordinary mortar for bonding fired clay brick or cement blocks. Therefore, in order for those building elements utilizing a bituminous material as a binder to be competitive with the accepted widely used building elements, there, of necessity, must be a low-cost, high-strength material for use as a bonding agent between the bituminous-containing structural elements. In addition, the material to be used must be easily applied. That is, it obviously cannot require a highly skilled chemist or engineer to formulate same at the site.

It has now been found that a highly efficient cementitious mortar may be made in accordance with this invention. The mortars hereinafter described are competitive pricewise with materials presently on the market when compared on a unit-structure basis. The mortar of this invention consists of a normal mortar of sand, cement and water to which has been added an emulsion of a terpolymer. The terpolymer was prepared by emulsion polymerization from alkyl acrylate, styrene and acrylic acid. The emulsion consists essentially of about 20 to 55 wt. percent solid and 80 to 45 wt. percent water.

The terpolymer to be used in this invention consists of an alkyl acrylate having an alkyl chain of from 1 to 18 carbon atoms, styrene and acrylic acid. The organic compounds are mixed in water with a material which will lower the surface tension of the water and allow the organic compounds to be contained therein. Such materials would be surfactants having an HLB number of about 11 to 18, preferably, about 12.5 to 17.8.

The surfactants to be used are preferably nonionic materials. However, a mixture of anionic and nonionic surfactants can be used if the ratio of nonionic to anionic surfactants is greater than one. In addition to the foregoing materials, to the aqueous mixture must be added a catalyst to effect the polymerization of the three organic components, that is, the acrylate, styrene and acrylic acid. The surfactants which can be used in the practice of this invention include the nonionic condensates of fatty acid esters, ester ethers, fatty alcohol ethers, alkylaryl polyglycol ethers, ethoxylated fatty amides and the fluorinated analogues of the foregoing groups of compounds, that is, the lipophilic portion of the molecule has fluorine substituted for the normal hydrogen. Representative nonionic surfactants include compounds having the formulae:

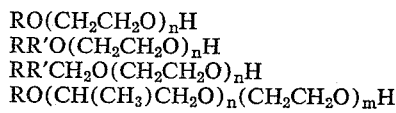

$RO(CH_2CH_2O)_nH$
$RR'O(CH_2CH_2O)_nH$
$RR'CH_2O(CH_2CH_2O)_nH$
$RO(CH(CH_3)CH_2O)_n(CH_2CH_2O)_mH$ wherein R represents an alkyl radical, R' a phenylene radical and $n$ and $m$ are positive numbers, the value of $n$ and $m$ and the number of carbon atoms in R providing a balance in conformance with the general requirements for the surfactant hereinbefore set forth.

The materials to be polymerized to form the terpolymer are acrylic acid, styrene and an alkyl acrylate such as ethyl acrylate, butyl acrylate, hexyl acrylate, octyl acrylate, heptyl acrylate, decyl acrylate, dodecyl acrylate, tetradecyl acrylate, hexadecyl acrylate, heptadecyl acrylate, octadecyl acrylate and hendecyl acrylate.

The catalysts for use in polymerizing the three compounds to form the terpolymers can be any catalyst recognized by the art which would be effective for such purpose. It is, of course, obvious that inasmuch as the catalyst will be operating in an aqueous mixture, it should preferably be soluble or partly soluble or compatible with water. The preferred types of catalysts for use in this invention, of course, are the peroxide-type catalysts, that is, a catalyst which has an excess of oxygen available. Such compounds would include the alkali persulfates and hydrogen peroxide. These peroxides may be used alone or in conjunction with reducing agents such as sodium metabisulfite, sodium sulfite or sodium thiosulfate.

In the practice of this invention, the emulsion is made by polymerizing about 25 to 60 wt. percent styrene, 75 to 40 wt. percent acrylate and 0.5 to 6 wt. percent acrylic acid. The combined weight percents of the three compositions will be substantially 100% of the terpolymer. The polymerization of the three components takes place in the presence of water such that the concentration of the components of the terpolymer comprises 20 to 65 wt. percent of the emulsion which comprises the three components of the terpolymer and water. To the mixture of the three components and water, there is added a surfactant to emulsify the three components into the water. The surfactants which can be used may be a nonionic surfactant, a mixture of nonionic surfactants or a mixture of nonionic and anionic surfactants wherein the ratio of anionic surfactant to nonionic surfactant is less than one. The three components of the terpolymer in water are caused to polymerize by a suitable polymerization catalyst. The polymerization of the three components of the terpolymer takes place prior to the addition of the emulsion to cement and sand to form the mortar.

The emulsion of the terpolymer can be used with the conventional mortars known to the art. The conventional mortars consist of an aggregate, usually sand, a cement such as portland cement and water wherein the ratio of cement to sand is in the range of from 1:2 to 1:9 by volume. To such a mixture there is added water and the emulsion of this invention.

The following examples are submitted for purposes of illustration only and are not to be construed as a limitation upon the scope of the invention as set forth in the appended claims.

EXAMPLE 1

Structural elements made from a bituminous binder and sand were joined together using mortars of this invention, the conventional cement mortar and a conventional mortar modified by adding polyvinyl acetate. The mortar made in accordance with this invention was made by mixing with sand and portland cement an emulsion comprising 40 wt. percent solid and 60 wt. percent water containing a surfactant consisting of polyethoxylated nonylphenol having 50 moles ethylene oxide and said solids of the emulsion comprising 65 wt. percent ethylacrylate, 34 wt. percent styrene and 1 wt. percent acrylic acid. The mixture of emulsion, sand and portland cement and water was utilized as the mortar. The conventional mortar contained 21.4 wt. percent masonry cement, 64 wt. percent sand and 14.6 wt. percent water. The polyvinyl acetate modified mortar comprised 62.4 wt. percent sand, 21.8 wt. percent portland cement and 10.5 wt. percent water to which was added 5 wt. percent polyvinyl acetate emulsion. The three mortars were then tested according to ASTM E-149. The results are set forth in the table below.

TABLE

| Cementitious Mortar | Wt. Percent Emulsion in Mortar | Bond Strength, p.s.i. | |
|---|---|---|---|
| | | Dry | Wet |
| Mortar with Terpolymer | 6 | 165 | 63 |
| Do | 13 | 310 | 100 |
| Do | [1] 13 | 320 | 85 |
| Mortar with Polyvinyl Acetate | 5 | 300 | 40 |
| Conventional Mortar | | 0 | 0 |

[1] Emulsion formulated in pilot plant.

Wet bond strength determined in accordance with ASTM E-149 after materials were soaked in water for 24 hours.

EXAMPLE 2

Various formulations of polyvinyl acetate mixture with sand and portland cement were tried. It was found that by increasing the weight percent of the polyvinyl acetate that the wet strength is unchanged. As can be seen from the above table, the terpolymer formulation of this invention gives very good wet and dry strengths. The early pilot plant data indicate that the materials may be mixed on a commercial scale with substantially the same properties as the materials mixed in the laboratories.

What is claimed is:
1. An article of manufacture comprising a bituminous binder containing structural unit; a second bituminous binder containing structural unit; and a cementitious mortar composition comprising a major amount of aggregate and cement and a minor amount of terpolymer composition consisting essentially of 0.5 to 6 wt. percent acrylic acid monomer, 25 to 60 wt. percent styrene monomer and 40 to 75 wt. percent of a $C_1$ to $C_{18}$ alkyl acrylate monomer between and in contact with the adjacent surfaces of said structural units.
2. An article of manufacture as in claim 1 in which the mortar composition contains in addition a nonionic surfactant.
3. An article of manufacture as in claim 1 wherein the alkyl acrylate of the cementitious mortar composition is ethyl acrylate.
4. An article of manufacture as in claim 1 in which the aggregate of the mortar composition is sand, the cement is Portland cement, the alkyl acrylate is ethyl acrylate and additionally, said composition contains a catalytic mixture of $K_2S_2O_5$ and $Na_2S_2O_5$.

References Cited

UNITED STATES PATENTS

| 2,795,564 | 6/1957 | Conn et al. | 260—29.6 |
| 2,311,233 | 2/1943 | Jaenicke et al. | 260—29.6 |
| 3,196,122 | 7/1965 | Evans | 260—29.6 |
| 3,242,121 | 3/1966 | Hill | 260—29.6 |
| 2,388,846 | 11/1945 | Hecht | 161—237 |
| 3,257,338 | 6/1966 | Sefton | 260—29.6 |
| 3,258,441 | 6/1966 | McEwan et al. | 260—29.6 |

MURRAY TILLMAN, *Primary Examiner.*

J. L. WHITE, *Assistant Examiner.*